Oct. 23, 1956        M. M. SALVADOR        2,768,257
DEVICE FOR OPERATING THE HORN OF MOTOR CARS
Filed Jan. 12, 1951        2 Sheets-Sheet 1
FIG. 1.
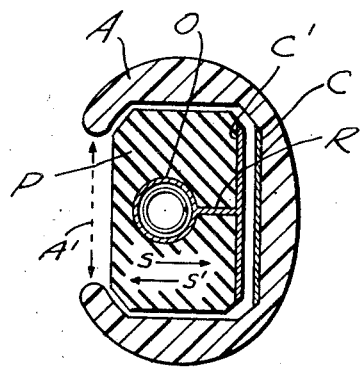
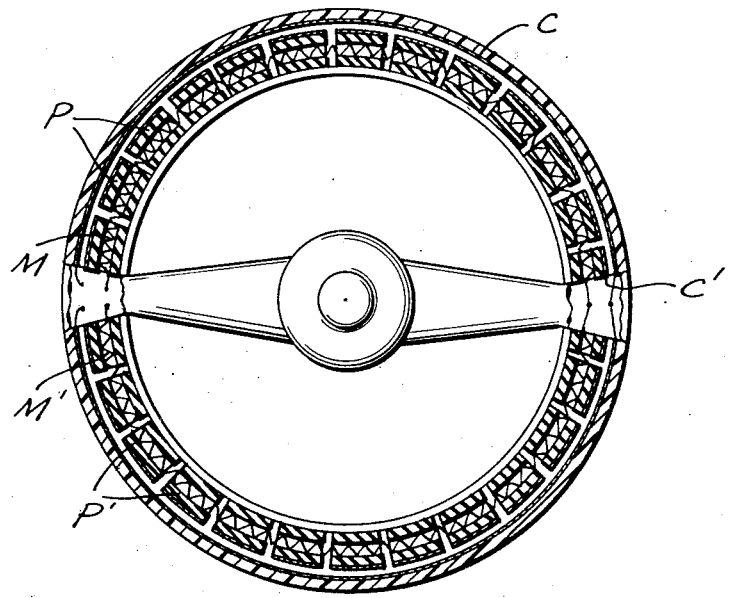
FIG. 2.
INVENTOR.
MIGUEL MUÑOZ SALVADOR
BY Oct. 23, 1956   M. M. SALVADOR   2,768,257
DEVICE FOR OPERATING THE HORN OF MOTOR CARS
Filed Jan. 12, 1951   2 Sheets-Sheet 2
FIG. 3.
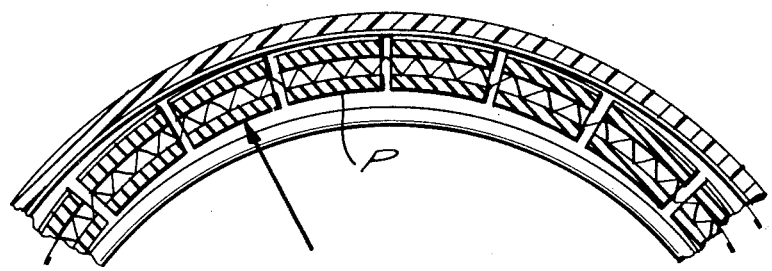
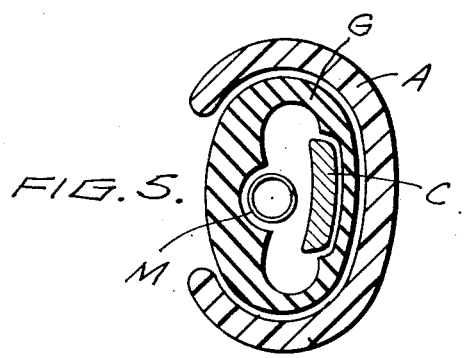
FIG. 5.
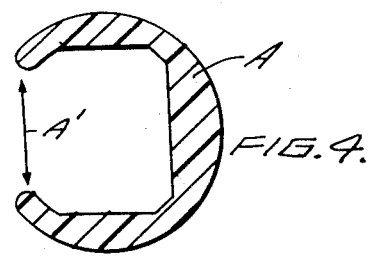
FIG. 4.
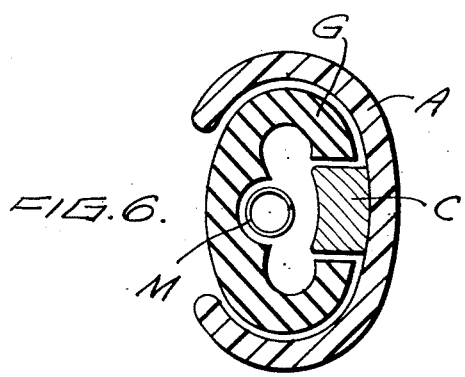
FIG. 6.
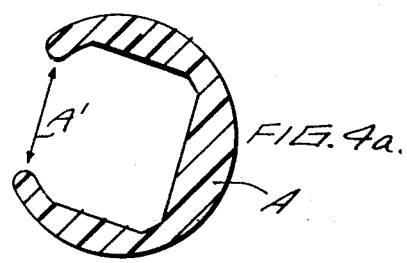
FIG. 4a.
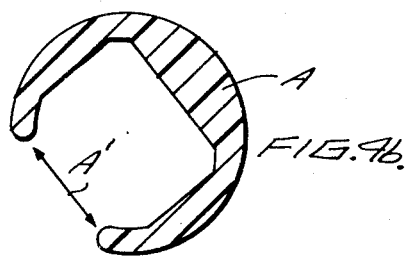
FIG. 4b.
INVENTOR.
MIGUEL MUNOZ SALVADOR
BY

United States Patent Office 2,768,257
Patented Oct. 23, 1956

2,768,257
DEVICE FOR OPERATING THE HORN OF MOTOR CARS

Miguel Muñoz Salvador, Madrid, Spain

Application January 12, 1951, Serial No. 205,635

Claims priority, application Spain July 12, 1950

3 Claims. (Cl. 200—61.57)

The present invention relates to an improvement of the device for operating the electric horn of motor cars.

The manufacturers of motor cars have devised several systems utilizing push-button switches for electric horns. Among these, for example, is one in the shape of a button placed either in the center of the steering wheel, or else on the so-called "dash-board"; whereas another consists in a ring placed in a position concentric to the steering wheel. In conclusion all these devices, no matter what their shape may be, oblige the driver to take his hand off the steering wheel, or to change his normal and comfortable position, in order to operate the switch.

The present invention is designed to solve this inconvenience, and in accordance therewith the device utilized for closing and opening the current which operates the electric horn is mounted inside a hollow steering wheel of the vehicle, said steering wheel being provided with a groove by means of which the driver operates the switch without having to take his hands off the steering wheel.

In the accompanying drawings, particular embodiments of the present invention are illustrated, and therein:

Figure 1 represents a section of the hollow steering wheel;

Figure 2 represents a top sectional view of the device, when the circuit is open;

Figure 3 is a view in the same position of a portion of the steering wheel in section, when the circuit is closed;

Figures 4, 4a and 4b are detail views showing the aperture of the ring placed in positions normal or oblique to the radius of the steering wheel, and;

Figures 5 and 6 represent a different embodiment of the device.

As will be observed in Figure 1, the steering wheel A, which is hollow inside, is provided with an aperture A' extending along its entire inner circumference, and to approximately one third of the exterior line of its section. On the inside, and in front of said aperture, there is a fixed metal element C, which is one of the poles of the circuit, and is insulated from the ring.

Furthermore, there are a certain number of elements P, made of an insulating material, having a bore O and a groove R. A metal element, embedded in the bore and the groove, ends in a flat or curved surface, and constitutes the other pole C' of the circuit.

These elements P can move inside the ring of the steering wheel, in the direction S—S'. The circuit is opened when the spring M urges the elements P in the direction S', and establishes contact between the poles C' and C when it urges the elements P in the direction S.

The spring M is a steel spiral member placed inside the bore O. It can also be an appropriately formed laminated steel strip.

As will be observed in Figure 2, the circuit is open, and in Figure 3, wherein a section of a portion of the steering wheel is shown, the circuit is closed.

As indicated in Figure 4, the aperture A' can be placed in a position either normal or oblique to the radius of the steering wheel.

The shape of the ends of this aperture, as well as the number and size of the elements P, is variable, and likewise the outer faces of the elements P can be either flat, concave or convex.

Finally, Figures 5 and 6 represent the replacement of the elements P and the pole C', shown in Figure 1, by a rubber element G. In this arrangement, the spring M is one of the circuit poles.

I claim:

1. A steering wheel and horn switch assembly comprising, in combination, a hollow steering wheel having an inner peripheral wall and formed with a peripheral opening passing through the inner wall thereof; a contact carrying portion located in said steering wheel opposite said opening; a contact mounted on said contact carrying portion facing said opening; a plurality of beads, each being formed with a bore passing therethrough from end to end, located within said hollow steering wheel opposite said opening thereof, said beads arranged end-to-end extending along the length of the wheel; a resilient, flexible member in stretched and permanently tensioned condition and being electrically conductive, passing through the bores in said beads, resiliently retaining said beads spaced from and facing said contact and supporting said beads for movement toward and away from said contact; and electrical contact means provided on said beads and connected to said electrically conductive flexible member so that a circuit including said electrically conductive flexible member, said contact means, and said contact may be completed.

2. A steering wheel and horn switch assembly comprising, in combination, a hollow steering wheel having an inner peripheral wall and formed with a peripheral opening passing through the inner wall thereof; a contact carrying portion located in said steering wheel opposite said opening; a contact mounted on said contact carrying portion facing said opening; a plurality of substantially cylindrical beads formed with openings passing therethrough from end to end being substantially parallel to the axis thereof located within said hollow steering wheel opposite said opening thereof, said beads arranged end-to-end extending along the length of the wheel; a resilient, flexible member in stretched and permanently tensioned condition having electrically conductive portions, passing through the openings in said beads, resiliently retaining said beads spaced from and facing said contact and supporting said beads for movement toward and away from said contact; and electrical contact means provided on said beads and connected to said electrically conductive portions of said flexible member so that a circuit including said electrically conductive portions, said contact means, and said contact may be completed.

3. A steering wheel and horn switch assembly comprising, in combination, a hollow steering wheel having an inner peripheral wall portion formed with an elongated opening having a width substantially smaller than the thickness of said wheel, extending along the inner periphery thereof, and communicating with the interior thereof; a plurality of beads each being formed with a bore passing therethrough from end to end, located within said hollow steering wheel opposite said opening thereof, said beads being arranged end-to-end extending along the length of the wheel, each of said beads being provided with electrical contact means on the surface thereof facing away from said opening and lining the interior of the bore therein, said contact means on said surface and in said bore being electrically connected; a continuous coil spring located in stretched condition within said bores of said plurality of beads in contact with said lining thereof and extending along the length of said wheel, said spring being electrically conductive and tending to move said beads towards said opening by its own resiliency; and electrically conductive means located in said wheel facing said electrical contact means on the surface of each of said beads for completing a circuit with said spring when the respective beads are moved radially toward the outer peripheral wall of said wheel for contacting the electrical contact means on the surface thereof with said electrically conductive means.

References Cited in the file of this patent

UNITED STATES PATENTS

| | | |
|---|---|---|
| 1,264,544 | Nevin | Apr. 30, 1918 |
| 1,345,259 | Saurage | June 29, 1920 |
| 1,373,496 | Frecheville | Apr. 5, 1921 |
| 2,025,979 | Getty | Dec. 31, 1935 |
| 2,025,980 | Getty | Dec. 31, 1935 |
| 2,025,981 | Getty | Dec. 31, 1935 |
| 2,128,916 | Cox | Sept. 6, 1936 |
| 2,211,131 | Knauber | Aug. 13, 1940 |